2,796,430
GLYOXAL DERIVATIVES

Brooke D. Aspergren, Kalamazoo, Mich., assignor to The Upjohn Company, Kalamazoo, Mich., a corporation of Michigan No Drawing. Application April 30, 1956,
Serial No. 581,270

12 Claims. (Cl. 260—513)

The present invention relates to novel α-polyalkoxy-alkyleneglyoxals of the formula

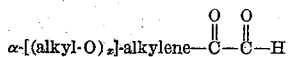

wherein $x$ is from two to three, inclusive, alkyl contains from one to four carbon atoms, inclusive, and alkylene [—$C_nH_{2n}$—] contains from one to six carbon atoms, inclusive [i. e. $n$ is from one to six, inclusive]; and sodium and potassium bisulfite, and hydrate, addition compounds thereof. Of particular interest are the α-(β-methoxyethoxy)-alkyleneglyoxals and α-[β-(methoxymethoxy)-ethoxy]-alkyleneglyoxals of the formulae

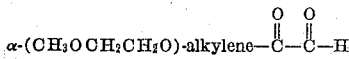

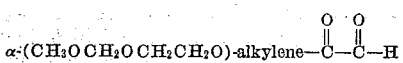

wherein alkylene contains from one to six carbon atoms, inclusive, as defined above; and sodium and potassium bisulfite, and hydrate, addition compounds thereof. Of most interest are α-(β-methoxyethoxy)-ethylgyloxal and α-[β-(methoxymethoxy)-ethoxy]-ethylglyoxal; and sodium and potassium bisulfite, and hydrate, addition compounds thereof.

An object of the present invention is to provide the above-defined classes of compounds which have antiviral activity, in particular virucidal activity. Said compounds are useful for virus prophylaxis and decontamination of areas and materials and can readily be applied as the active ingredient in solutions, emulsions and suspensions for spraying, washing, painting, immersing, etc., dusts, aerosols, fumigants, etc., according to methods and procedures well known in the pesticide and disinfectant arts. The sodium and potassium bisulfite, and hydrate, addition compounds of the present invention frequently are more stable and have greater water solubility than the parent glyoxal compounds, and, therefore, said addition compounds usually are a preferred embodiment of the invention for the above-described uses. Other objects of the present invention, and uses of the novel compounds thereof, will be apparent to one skilled in the art.

TABLE I

| Test Compound—Formula | Milligrams per egg | Protective Index Newcastle's Virus | Protective Index Influenza A Virus |
|---|---|---|---|
| CH₃OCH₂CH₂O—CH(CH₃)—CO—CH | 4.0 | | 93 |
|  | 4.7 | 81 |  |
| CH₃OCH₂CH₂O—CH(CH₃)—CO—CH·H₂O | 8.0 | 98, 96 | 71 |
| CH₃OCH₂CH₂O—CH(CH₃)—CO—CH·NaHSO₃ | 6.0 | 99, 99 | 72 |
| CH₃OCH₂OCH₂CH₂O—CH(CH₃)—CO—CH | 0.16 | 87, 83 | 84 |

Efficacy of the present antiviral compounds is illustrated by Table I which shows the typically superior results afforded by representative compounds of this invention when used in the well-known in ovo survival test for antiviral potency, employing Newcastle's virus (NJ–KD strain) and Influenza A virus (PR8 strain) as illustrative viruses. In the test method used to obtain the data in Table I any particular test compound is dissolved in water or suspended in water-carboxymethyl cellulose, depending on the degree of water solubility. A known volume of such a solution or suspension containing a known concentration of the test compound is injected into the allantoic sac of ten-day fertile eggs, using the technique described by Beveridge and Burnet, Medical Research Council, Special Report Series No. 256, "The Cultivation of Viruses and Rickettsiae in the Chick Embryo," London, His Majesty's Stationary Office, 1946. The test compound is usually administered at or slightly less than the maximum tolerated dose, i. e., the greatest amount which when similarly administered is found to cause no deaths in similar eggs during a 216-hour incubation period. The same volume of the same menstruum without test compound is injected into similar eggs as a control. About fifteen minutes later all eggs, test and control, are inoculated with a virus suspension containing approximately fifty times the LD₅₀ dosage of virus; one LD₅₀ is that amount which kills fifty percent of virus-infected embryonated eggs. The eggs are incubated at 37 degrees centigrade. Survivorship is determined by candling the eggs at eight-hour intervals during a 216-hour period. The protection afforded by a test compound is conveniently expressed thus: percent survivorship of treated eggs after 216 hours (e. g. ninety percent) minus percent survivorship of control eggs after 216 hours (e. g. five percent) equals the protective index (e. g. 85), the maximum protective index value being 100. The test compounds listed in Table I, therefore, are highly potent antiviral agents.

The α-polyalkoxy-alkyleneglyoxal compounds of the present invention are prepared by reaction of an α,β-alkenal with an alkoxyalkanol or alkoxyalkoxyalkanol and selenium dioxide as illustrated by the equation

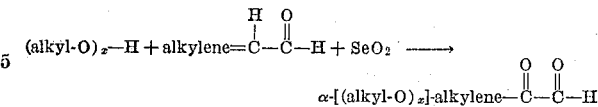

wherein $x$, alkyl, and alkylene are defined as above. Reaction of the glyoxal product with sodium or potassium bisulfite, or water, provides the glyoxal addition compounds of the present invention.

The following examples are illustrative only and are not to be construed as limiting the scope of the invention.

*Example 1*

In a two-liter, three-necked resin flask equipped with a water-cooled condenser, mechanical stirrer and a dropping funnel, 350 grams (five moles) of crotonaldehyde is boiled under reflux with stirring while a solution of 444 grams (four moles) of selenium dioxide dissolved in 835 grams (eleven moles) of β-methoxyethanol is added during a period of about one hour. The resulting mixture is heated at the boiling point with stirring for four hours, the large aggregate of precipitated selenium being removed when it begins to interfere with the stirring. After standing for sixteen hours at room temperature, the reaction mixture is filtered to remove the remaining selenium. The excess β-methoxyethanol is then removed by distillation under reduced pressure (boiling point 35–37 degrees centigrade at seventeen millimeters pressure) using a fifteen-centimeter Vigreux column, and the remaining product distilled once at nine millimeters pressure and redistilled using a fifteen-centimeter helices-packed column to obtain 235 grams (37 percent of the theoretical amount) of α-keto-β-(β-methoxyethoxy)-butyraldehyde [$CH_3OCH_2CH_2OCH(CH_3)COCHO$] as a yellow-orange fluid oil; boiling point 62–66 degrees centigrade at nine millimeters pressure.

Example 2

To 200 grams (2.9 moles) of boiling crotonaldehyde in a one-liter, three-necked, round-bottom flask equipped with stirrer, reflux condenser, and dropping funnel heated in a Glascol mantle is added dropwise 133 grams (1.2 moles) of selenium dioxide dissolved in 425 grams (four moles) of β-(methoxymethoxy)-ethanol. After six hours heating and stirring 68.2 grams (72 percent of the theoretical amount) of selenium is removed by filtration. Excess starting materials are removed by distillation through a fifteen-centimeter Vigreux column, and the α-keto-β-[β-(methoxymethoxy)-ethoxy]-butyraldehyde

[$CH_3OCH_2OCH_2CH_2OCH(CH_3)COCHO$]

product distilled; boiling point 93–95 degrees centigrade at 0.25 millimeter pressure; $n_D^{20}$ 1.4680.

Example 3

A solution of 120 grams of 79 percent pure (hydrogen peroxide analysis method) α-keto-β-(β-methoxyethoxy)-butyraldehyde (actually 95 grams, 0.59 mole) and about one-half liter of deionized water is prepared, extracted several times with Skelly-solve A (mixture of pentanes and hexanes) and then passed through a column containing Amberlite IR–45 resin (amine-type anion exchange resin). The resulting solution is concentrated at a temperature below fifty degrees centigrade (water bath temperature) at twenty millimeters pressure to provide 137 grams of pale yellow aqueous solution, $$d_{25}^{25}\ 1.188$$

and containing 75 grams (71 percent of the theoretical amount) of α-keto-β-(β-methoxyethoxy)-butyraldehyde hydrate [$CH_3OCH_2CH_2OCH(CH_3)COCHO \cdot H_2O$] in a concentration of 0.65 gram per milliliter (55 percent by weight). A selenium determination on this product indicates between 77 and 155 parts per million. Further concentration of a two-gram sample of this product gives a highly viscous, pale yellow syrup which assays 98 percent monohydrate by the hydrogen peroxide analysis method.

Example 4

Reaction of fifty grams of 79 percent pure α-keto-β-(β-methoxyethoxy)-butyraldehyde (actually forty grams, 0.25 mole) with the theoretical amount of sodium bisulfite in aqueous ethanol solution provides the sodium bisulfite addition compound, 67 grams (84 percent of the theoretical amount), as fine white crystals. Titration of a sample of α-keto-β-(β-methoxyethoxy)-butyraldehyde sodium bisulfite addition compound

[$CH_3OCH_2CH_2OCH(CH_3)COCHO \cdot NaHSO_3$]

after oxidation with excess hydrogen peroxide requires 2.97 equivalents of base per mole, whereas the theoretical value is 3.00.

Analysis.—Calcd. for $C_7H_{13}NaO_7S$: C, 31.82; H, 4.96; Na, 8.71. Found: C, 31.50, 31.40; H, 4.99, 4.94; Na, 9.23.

Example 5

Reaction of acrolein with β-methoxyethanol and selenium dioxide according to the procedure of Example 1 provides β-(β-methoxyethoxy) - α - ketopropionaldehyde [$CH_3OCH_2CH_2OCH_2COCHO$].

Example 6

Following the procedure of Example 3, α-keto-β-[β-(methoxymethoxy)-ethoxy]-butyraldehyde is reacted with water to obtain α-keto-β-[β-(methoxymethoxy)-ethoxy]-butyraldehyde hydrate

[$CH_3OCH_2OCH_2CH_2OCH(CH_3)COCHO \cdot H_2O$]

Example 7

According to the procedure of Example 4, α-keto-β-[β-(methoxymethoxy)-ethoxy]-butyraldehyde is reacted with sodium bisulfite in aqueous ethanol solution to obtain α-keto-β-[β-(methoxymethoxy) - ethoxy] - butyraldehyde sodium bisulfite addition compound

[$CH_3OCH_2OCH_2CH_2OCH(CH_3)COCHO \cdot NaHSO_3$]

By substituting potassium bisulfite for the sodium bisulfite in the foregoing procedure α-keto-β-[β-(methoxymethoxy)-ethoxy]-butyraldehyde potassium bisulfite addition compound

[$CH_3OCH_2OCH_2CH_2OCH(CH_3)COCHO \cdot KHSO_3$]

is obtained.

Example 8

Acrolein reacted with β-(methoxymethoxy)-ethanol and selenium dioxide according to the procedure of Example 2 provides β-[β-(methoxymethoxy)-ethoxy] - α - ketopropionaldehyde [$CH_3OCH_2OCH_2CH_2OCH_2COCHO$]. Reaction of this ketoaldehyde with water according to the procedure of Example 3, or with sodium bisulfite according to the procedure of Example 4, provides β-[β-(methoxymethoxy)ethoxy]-α-ketopropionaldehyde hydrate and sodium bisulfite addition compound, respectively.

Example 9

Reaction of the appropriate α,β-alkenal with the appropriate substituted alkanol and selenium dioxide according to the procedures of Examples 1 and 2 provides α-(β-methoxyethoxy) - isopropylglyoxal, α-[β-(methoxymethoxy) - ethoxy] - isopropylglyoxal, β - (β - methoxyethoxy) - β-ethyl - α - ketohexaldehyde, β - (β - methoxyethoxy) - β - ethyl-α-ketoisohexaldehyde, β - (β-methoxyethoxy) - α - ketohexaldehyde, α-(β-methoxyethoxy)-isobutylglyoxal, α - [β-(methoxymethoxy)-ethoxy]-(secondary-butyl) - glyoxal, β-[β-(methoxymethoxy)-ethoxy]-β-ethyl-α-ketohexaldehyde, β-(β-ethoxyethoxy)-β-methyl-α-ketohexaldehyde, β-(β-propoxyethoxy)-β-ethyl-α-ketoisohexaldehyde, β-(β-butoxyethoxy)-α-ketobutyraldehyde, β-(β-butoxyethoxy) - α - ketopropionaldehyde, β-(β-butoxyethoxy) - β - ethyl-α-ketohexaldehyde, β-(ω-methoxypropoxy)-β-(n-propyl) - α - ketohexaldehyde, β-(ω-methoxybutoxy) - α - ketopropionaldehyde, β-(ω-ethoxybutoxy)-β-isopropyl-α-ketohexaldehyde, β-(β-propoxyisopropoxy)-β-(n-propyl)-α-ketoisohexaldehyde, α-(β-isobutoxyethoxy)-isopropylglyoxal, α - (ω - propoxypropoxy) - (secondary-butyl) - glyoxal, β-(ω-ethoxypropoxy)-β-isopropyl-α-ketohexaldehyde, α-[β - (β - ethoxyethoxy)-ethoxy]-isobutylglyoxal, β-[β-(β-butoxyisobutoxy)-butoxy] - α - ketopropionaldehyde, β-[ω-(ω-methoxypropoxy)-butoxy]-α-ketobutyraldehyde, etc.

Example 10

Following the procedures of Examples 3 and 4, the compounds of Example 9 are reacted with water, or sodium or potassium bisulfite, to obtain the hydrate, or sodium or potassium bisulfite, addition compounds thereof.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A compound selected from the group consisting of α-polyalkoxy-alkyleneglyoxals of the formula $$\alpha\text{-[(alkyl-O)}_x\text{]-alkylene}-\overset{\overset{\text{O}}{\|}}{\text{C}}-\overset{\overset{\text{O}}{\|}}{\text{C}}-\text{H}$$

wherein $x$ is from two to three, inclusive, alkyl contains from one to four carbon atoms, inclusive, and alkylene contains from one to six carbon atoms, inclusive; and sodium and potassium bisulfite, and hydrate, addition compounds thereof.

2. α-(β-methoxyethoxy)-alkyleneglyoxals of the formula

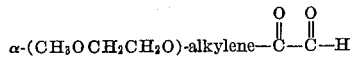

wherein alkylene contains from one to six carbon atoms, inclusive.

3. Sodium bisulfite addition compounds of the compounds of claim 2.

4. Hydrate addition compounds of the compounds of claim 2.

5. α-[β-(methoxymethoxy)-ethoxy]-alkyleneglyoxals of the formula

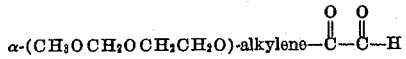

wherein alkylene contains from one to six carbon atoms, inclusive.

6. Sodium bisulfite addition compounds of the compounds of claim 5.

7. Hydrate addition compounds of the compounds of claim 5.

8. α-(β-methoxyethoxy)-ethylglyoxal.

9. α-(β-methoxyethoxy)-ethylglyoxal sodium bisulfite addition compound.

10. α-(β-methoxyethoxy)-ethylglyoxal hydrate addition compound.

11. α-[β-(methoxymethoxy)-ethoxy]-ethylglyoxal.

12. α-[β-(methoxymethoxy)-ethoxy]-ethylglyoxal sodium bisulfite addition compound.

No references cited.